United States Patent

Cheng et al.

[11] Patent Number: 4,659,540
[45] Date of Patent: Apr. 21, 1987

[54] COMPOSITE CONSTRUCTION FOR NUCLEAR FUEL CONTAINERS

[75] Inventors: Bo-Ching Cheng; Herman S. Rosenbaum, both of Fremont; Joseph S. Armijo, Saratoga, all of Calif.

[73] Assignee: General Electric Company, San Jose, Calif.

[21] Appl. No.: 578,742

[22] Filed: Feb. 9, 1984

Related U.S. Application Data

[62] Division of Ser. No. 97,378, Nov. 26, 1979, Pat. No. 4,445,942.

[51] Int. Cl.$^4$ ................................................ G21C 3/06
[52] U.S. Cl. .................................................. 376/417
[58] Field of Search .......................... 376/414, 416–418

[56] References Cited

U.S. PATENT DOCUMENTS 4,017,368  4/1977  Wax et al. .
4,093,756  6/1978  Donaghy .
4,233,086  11/1980  Vesterlund .

FOREIGN PATENT DOCUMENTS 1320373  6/1973  United Kingdom .
1433526  4/1976  United Kingdom ................ 376/416
1584496  2/1981  United Kingdom ................ 376/417

*Primary Examiner*—Harvey E. Behrend
*Attorney, Agent, or Firm*—Ivor J. James, Jr.; Raymond G. Simkins

[57] ABSTRACT

An improved method for producing nuclear fuel containers of a composite construction having components providing therein a barrier system for resisting destructive action by volatile fission products or impurities and also interdiffusion of metal constituents, and the product thereof. The composite nuclear fuel containers of the method comprise a casing of zirconium or alloy thereof with a layer of copper overlying an oxidized surface portion of the zirconium or alloy thereof.

9 Claims, 1 Drawing Figure

U.S. Patent    Apr. 21, 1987    4,659,540
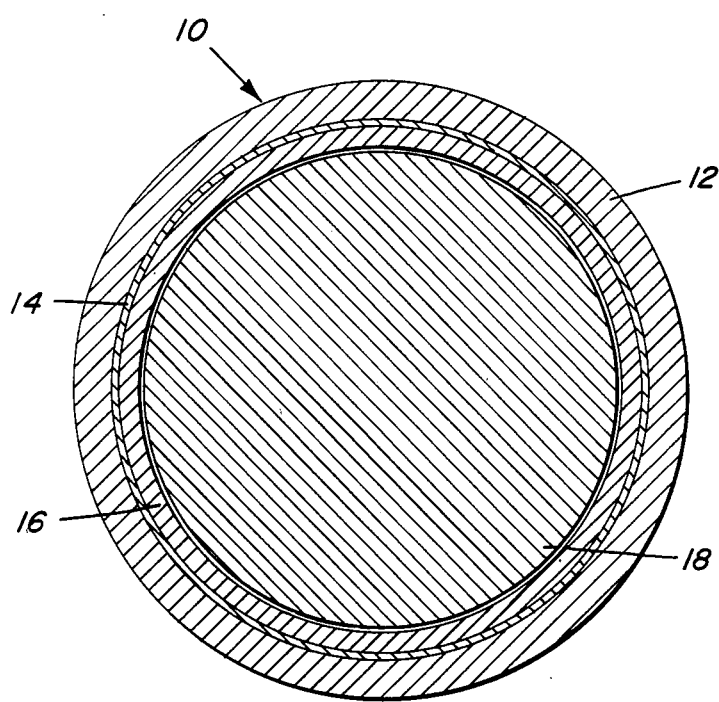

COMPOSITE CONSTRUCTION FOR NUCLEAR FUEL CONTAINERS

The Government has rights in this invention pursuant to Subcontract No. 3-20-46 under Prime Contract EN-77-C-02-4473 awarded by the U.S. Department of Energy.

This is a division of application Ser. No. 097,378, filed Nov. 26, 1979, now Pat. No. 4,445,942.

BACKGROUND OF THE INVENTION

This invention relates broadly to an improvement in the production of containers for nuclear fuel for service in nuclear fission reactors, and of nuclear fuel elements comprising the containers having therein a body of nuclear fuel materials such as compounds of uranium, plutonium and thorium, and the products thereof comprising nuclear fuel containers and elements.

Nuclear reactors are presently being designed, constructed and operated in which the nuclear fuel is contained in fuel elements which can have various geometric shapes, such as plates, tubes, or rods. The fuel material is usually enclosed in a corrosion-resistant non-reactive, heat conductive container or sheath. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The container serves several purposes and two primary purposes are: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator, or both if both the coolant and the moderator are present. Common container materials are stainless steel, aluminum and its alloys, zirconium and its alloys, niobium (columbium), certain magnesium alloys, and others. The failure of the container, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the container material due to mechanical or chemical reactions of these container materials under certain circumstances. Zirconium and its alloys, under normal circumstances, are excellent nuclear fuel containers since they have low neutron absorption cross sections and at temperatures below about 750° F. (about 398° C.), are strong, ductile, extremely stable and non-reactive in the presence of demineralized water or steam which are commonly used as reactor coolants and moderators.

However, fuel element performance has revealed a problem with the brittle splitting of the container due to the combined interactions between the nuclear fuel, the container and the fission products produced during nuclear fission reactions. It has been discovered that this undesirable performance is promoted by localized mechanical stresses due to fuel-container differential expansion (stresses in the container are localized at cracks in the nuclear fuel). Corrosive fission products are released from the nuclear fuel and are present at the intersection of the fuel cracks with the container surface. Fission products are created in the nuclear fuel during the fission chain reaction during operation of a nuclear reactor. The localized stress is exaggerated by high friction between the fuel and the container.

Within the confines of a sealed fuel element, hydrogen gas can be generated by the slow reaction between the container, and the residual water inside the container may build up to levels which under certain conditions can result in localized hydriding of the container with concurrent local deterioration in the mechanical properties of the container. The container is also adversely affected by such gases as oxygen, nitrogen, carbon monoxide and carbon dioxide over a wide range of temperatures.

The zirconium container of a nuclear fuel element is exposed to one or more of the gases listed above and fission products during irradiation in a nuclear reactor and this occurs in spite of the fact that these gases and fission product elements may not be present in the reactor coolant or moderator, and further may have been excluded as far as possible from the ambient atmosphere during manufacture of the container and the fuel element. Sintered refractory and ceramic compositions, such as uranium dioxide and other compositions used as nuclear fuel, release measurable quantities of the aforementioned gases upon heating, such as during fuel element manufacture and further release fission products during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium container containing the nuclear fuel.

Thus in light of the foregoing, it has been found desirable to minimize attack of the container from water, water vapor, hydrogen and other gases reactive with the container from inside the fuel element throughout the time the fuel element is used in the operation of nuclear power plants. One such approach has been to find materials which will chemically react rapidly with the water, water vapor, hydrogen, and other gases to eliminate these from the interior of the container, and such materials are called getters.

A number of other approaches to this problem have been enumerated in some detail in U.S. Pat. Nos. 4,022,662, issued to Gordon and Cowan May 10, 1977; 4,029,545 issued to Gordon and Cowan June 14, 1977; and 4,045,288, issued to Armijo Aug. 30, 1977, all assigned to the same assignee of this application for patent. The contents of the disclosures of said U.S. Pat. Nos. 4,022,662, 4,029,545 and 4,045,288 are accordingly incorporated by reference in this application for patent.

For example, it has been suggested to introduce a barrier between the nuclear fuel material and the container casing holding the nuclear fuel material as disclosed in U.S. Pat. No. 3,230,150 (copper foil), German Patent Publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the container (e.g., copper and other metals can react with the container altering the properties of the container), or the nuclear fission reaction (e.g., by acting as neutron absorbers). None of the listed references disclose solutions to the recently discovered problem of localized chemical-mechanical interactions between the nuclear fuel and the container.

Further approaches to the barrier concept are disclosed in U.S. Pat. No. 3,969,186, issued July 13, 1976 (refractory metal such as molybdenum, tungsten, rhenium, niobium and alloys thereof, in the form of a tube or foil of single or multiple layers or a coating on the internal surface of the container and U.S. Pat. No. 3,925,151, issued Dec. 9, 1975 (liner of zirconium, niobium or alloys thereof between the nuclear fuel and the containers with a coating of a high lubricity material between the liner and the container).

A recently proposed response to the problem of fuel container or element failures attributable to deleterious interactions between container casings composed of zirconium or zirconium alloys and the nuclear fuel and/or the fission products thereof, has been to provide a copper metal lining within the casing as a barrier layer on the inside surface of such fuel casings whereby it will be interposed between the zirconium casing and the nuclear fuel provided therein. A layer of copper plating is generally considered to primarily function as a physical and chemical barrier impeding destructive fission products, such as cadmium, cesium, iodine and the like, from contacting and attacking the zirconium or zirconium alloy of the fuel element casing or container.

The copper layer or intermediate barrier thereof provides a preferential reaction site or body for reaction with volatile impurities or fission products from within the nuclear fuel element, and thus serves to protect or shield the fuel container casing from exposure to and attack by such destructive agents.

However, the fission reactions occurring in nuclear reactors subject the internal surface portion of a fuel container, such as an inner layer of copper cladding or plating, to temperatures that are discernably greater than the temperatures reached by the outer portion of a fuel container such as the zirconium or alloy thereof of the fuel casing that is continuously in contact with the circulating coolant or heat transfer medium. Exposure over prolonged periods to reactor fission temperatures and environments tend to promote interdiffusions of copper from the inner plating layer and the zirconium or its alloy of the outer casing substrate at their contacting interface. Any significant interdiffusion of these contacting metals or their alloys can result in the formation of low melting (for example below about 1200° C.) liquid entectic phases between the zirconium or its alloy of the container casing and the lining of copper cladding, as well as the formation of intermetallic phases of inferior or inadequate properties such as reduced resiliency and tensile strength or embrittlement.

Measures for deterring the occurrence of such interdiffusions of the adjoining different metals or alloy of the container casing and the internal liner with the accompanying debilitating effects have been proposed. One remedial measure for precluding the occurrence of this metal interdiffusion phenomenon and the property losses attributable thereto comprises deploying a diffusion barrier intermediate the container casing substrate and the overlying liner within the casing. An oxide of zirconium or alloy thereof has been found to be an effective diffusion barrier, whereby simply oxidizing the inner surface of a zirconium or alloy thereof container casing comprising the substrate for deposition of the copper liner thereover provides a feasible and advantageous means for preventing interdiffusion of the metals and the accompanying weakening effects attributable thereto. Oxidation of zirconium or alloys thereof can be readily achieved by the application thereto of steam.

Although an oxide phase at the interface of the adjoining metals provides an apt remedy for the interdiffusion problem, the presence of an oxide layer covering the substrate surface of the zirconium casing imposes significant restrictions upon the techniques or options for effective application of a copper layer thereover because such oxides lack effective electrical conductance. For instance, the highly effective, common electrolytic deposition procedures for metal such as disclosed in U.S. Pat. Nos. 4,017,368 and 4,137,131, would be decidedly curtailed or precluded from use by the interposing of an oxide phase of very low electrical conductivity between the metal substrate and metal-containing electrolytic solution, whereby less effective or complex alternatives must be utilized, such as the electroless deposition procedure disclosed in U.S. Pat. No. 4,093,756. Moreover, it appears that the depositing of copper metal on an oxide surface with such electroless depositions procedure is prone to a blistering phenomenon in the deposited layer or cladding.

SUMMARY OF THE INVENTION

This invention comprises a novel and improved method of producing a composite nuclear fuel container for nuclear fission reactor service, and the products thereof, comprising a casing or fuel sheath of zirconium or its alloy having therein a lining of deposited copper superimposed over the inside surface of the zirconium or alloy of the casing or sheath, and a layer of oxide of the zirconium or alloy thereof formed on the said inside surface of the casing or sheath and positioned intermediate thereof and the deposited copper.

The term zirconium throughout the balance of the application is used and understood to include alloys of zirconium as well as the pure zirconium metal itself.

OBJECTS OF THE INVENTION

It is a primary object of this invention to provide a method for producing improved containers for fissionable nuclear fuel for service in nuclear fission reactors capable of effectively performing in such service for extended periods of operation without failure or loss of structural integrity, and the container products thereof.

It is also an object of this invention to provide an improved and unique method for producing containers for fissionable nuclear fuel, or fuel elements comprising the same, for service in nuclear fission reactors, and the products thereof, that resist the destructive elements and conditions derived from the fissionable nuclear fuel or fission reactions thereof over long periods of service in nuclear reactors.

It is a further object of this invention to provide a distinctive process for manufacturing nuclear fission fuel containers, and fuel elements comprising a body of fissionable nuclear fuel within such containers, and the fuel container products thereof, for service in nuclear fission reactors, having a barrier system that gives a long-term resistance to attack or deterioration attributable to exposure to the high temperatures and corrosive fission products and environment encountered within nuclear reactors, and also impedes or prevents interdiffusion of the different metals of the component layers and the potentially debilitative effects of interdiffusion.

It is a still further object of this invention to provide a novel method for making zirconium or zirconium alloy containers for fissionable nuclear fuel, or nuclear fuel elements thereof, for nuclear fission reactor service, and the fuel container products of the method, comprising a fuel casing of zirconium or alloy thereof with a layer of copper plated thereon and a zirconium oxide phase or body on the surface intermediate the casing of zirconium or alloy thereof and the plated copper layer thereon.

DESCRIPTION OF THE DRAWING

The figure comprises a cross-sectional view of one embodiment of a container for nuclear fuel according to this invention.

DESCRIPTION OF A PREFERRED EMBODIMENT

This invention comprises a distinctive method of producing containers for fissionable nuclear fuel for service in nuclear fission reactors. The method of the invention includes a specific combination of sequenced steps or operations for forming a fuel container of a composite construction including a liner layer of copper plated over the inside surface of a zirconium or alloy thereof container casing and a layer of a oxidized surface portion of the zirconium or its alloy on the inside of the casing interposed between the casing's interior and the liner cladding or layer of plated copper superimposed thereover. The invention additionally includes the fissionable nuclear fuel containers of such a composite construction produced by the method, and fissionable fuel elements comprising said containers having therein a suitable fissionable nuclear fuel such as uranium compounds, plutonium compounds, thorium compounds, or mixtures of such fissionable fuel materials.

Fissionable nuclear fuel containers for nuclear fission reactors, and fissionable fuel elements of such containers having fissionable fuel therein composed of an outer casing of zirconium or its alloys with a liner layer of copper plated on its inside surface for providing a chemical and physical barrier to destructive fission products and conditions, and a layer or body of an oxide of zirconium or its alloys intermediate the casing substrate and overlying copper liner layer for providing a barrier to interdiffusion of the different metal components, can be effectively produced essentially free of defects and in superior quality by the hereinafter described method of this invention.

In accordance with a preferred embodiment of this invention, aptly prepared or cleaned inside surfaces of zirconium or zirconium alloy fuel container casings are first electroplated with copper metal to deposit thereover a thin lining layer of copper of less than about 10 microns in thickness, such as about 0.5 to about 5 microns thick, to thereby form a relatively porous layer of copper superimposed over the zirconium of the inner surface of the casing. Steam is capable of readily penetrating and passing through such a thin and in turn porous copper layer whereby the copper lined inside zirconium or its alloy surface of the fuel casing is then treated with steam to oxidize the surface of the zirconium or alloy thereof underlying the porous copper layer. De-aerated steam at temperatures of about 300° C. to about 400° C. will pass through such a thin, porous copper layer and effectively oxidize the underlying zirconium or its alloy, forming an oxide layer or phase thereof under the copper layer and intermediate to it and the casing substrate without discernably acting upon or oxidizing the copper metal plated thereover. Thus, the thin, porous liner layer of copper metal overlying the in situ formed intermediate body or layer of an oxide of zirconium or its alloy retains its high level of electrical conductivity and provides a very effective electrode or conductive base for the electrolytic deposition or plating of metals thereon.

Following the formation of a subsurface body of an oxide of zirconium or its alloy underlying the porous layer copper with the application of steam passing therethrough for the purpose of imposing a metal diffusion barrier between the zirconium and cladding of copper, additional copper metal is electrolytically plated on the initially applied thin porous layer of copper to produce a copper liner layer covering the inside surface of the zirconium casing of any suitable thickness or apt mass to provide an effective chemical and physical barrier protecting the zirconium casing from damaging fission products and conditions.

Thus, in the procedure of the method of this invention, an electrically conductive metallic substrate is available for the plating or deposition of the copper whereby it enables the especially advantageous use of common and more effective electrolytic metal plating processes for the formation of either or both the initially deposited copper layer and the subsequently deposited second copper layer that together provide a "chemical" barrier lining within the fuel container, while also enabling the in situ formation of a body of zirconium oxide to provide a barrier to interdiffusion of the different metal components thereof.

Referring to the drawing, there is shown a nuclear fuel element product of the method of this invention in cross-section including a container constructed according to this invention. The container 10 comprises a casing or sheath 12 of zirconium, or an alloy of zirconium, with a layer of oxide of the zirconium or alloy thereof 14 on its inside surface, and a lining layer 16 of copper comprising the initially deposited steam permeable layer and the subsequently deposited second layer.

A body of nuclear fuel 18, for example pellets, of an oxide of uranium, plutonium and/or thorium is retained within the container 10 to isolate the fuel from the nuclear reactor's coolant medium.

An example of a preferred mode of practicing this invention is as follows. The inside area of fuel casings composed of zirconium alloy tubing (ZIRCALOY-2 alloy—see U.S. Pat. No. 4,164,420) are treated with $HF/HNO_3$ solution for cleaning and then etched with $NH_4HF_2/H_2SO_4$ solution to provide a surface condition of optimum receptiveness for electrolytic plating. A thin layer of copper metal of about 1 to 2 microns thick is then electrolytically plated over the conditioned inside surface of the zirconium alloy casings in the usual manner. Next, the thinly copper plated inside zirconium alloy surface of the casings is subjected to de-aerated steam at a temperature of about 400° C. in an autoclave at 10 psi for 24 hours, whereupon the steam sufficiently penetrates through the porous copper metal covering the zirconium alloy to form in situ a body or layer of an oxide of zirconium about 0.5 micron thick positioned between the zirconium casing substrate and the overlying layer of copper. Thereafter, the surface of the initially deposited copper layer overlying the oxide of zirconium formed in situ intermediate the zirconium alloy substrate and plating superimposed thereover, is subjected to a subsequent electrolytic copper plating operation to add additional copper metal thereto until a layer of suitable thickness of about 10 microns is formed thereby.

What is claimed is:

1. A container for nuclear fuel for service in nuclear fission reactors, comprising:
   (a) a casing of metal selected from the group consisting of zirconium and zirconium alloys;
   (b) a composite lining of at least two individually deposited copper layers superimposed over the inside surface of said metal casing in sufficient thickness to provide a composite copper lining providing an effective chemical and physical barrier to reactor fuel fission products and conditions;
   (c) a layer of oxide of the metal of the casing selected from the group consisting of zirconium and zirconium alloys on the inside surface of said metal casing and intermediate said inside surface and the individually deposited composite lining of layers of copper superimposed over said inside surface; and,
   (d) said composite lining of layers of copper being composed of an underlying steam permeable, thin porous layer of copper having been initially deposited on the inside surface of the metal casing while said surface was substantially oxide free, and an overlying second layer of subsequently deposited copper.

2. The container for nuclear fuel of claim 1, wherein the underlying steam permeable, thin porous layer of copper of the composite lining is up to about 5 microns thick.

3. The container for nuclear fuel of claim 1, wherein the underlying steam permeable, thin porous layer of copper of the composite lining is about 0.5 to about 5 microns thick.

4. The container for nuclear fuel of claim 1, wherein the overlying second layer of copper of the composite lining is about 1 to about 9 microns thick.

5. The container for nuclear fuel of claim 1, wherein the overlying second layer of copper of the composite lining is about 5 to about 9 microns thick.

6. The container for nuclear fuel of claim 1, wherein the composite lining of at least two individually deposited copper layers is approximately 10 microns thick.

7. The container for nuclear fuel of claim 1, wherein the layer of oxide of the metal of the casing intermediate the inside surface of the casing and the composite lining of layers of copper deposited thereon is about 0.5 to about 1 micron thick.

8. The container for nuclear fuel of claim 1, wherein said container includes a body of nuclear fuel material selected from uranium compounds, plutonium compounds, thorium compounds, and mixtures thereof.

9. A container for nuclear fuel for service in nuclear fission reactors, comprising:
   (a) a casing of metal selected from the group consisting of zirconium and zirconium alloys;
   (b) a composite lining of at least approximately 10 microns thick of two individually deposited copper layers superimposed over the inside surface of said metal casing to provide a composite copper lining of suitable thickness providing an effective chemical and physical barrier to reactor fuel fission products and conditions;
   (c) a layer of oxide of the metal of the casing selected from the group consisting of zirconium and zirconium alloys about 0.5 to about 1 micron thick formed in situ on the inside surface of said metal casing and intermediate said inside surface and the individually deposited composite lining of layers of copper superimposed over said inside surface; and,
   (d) said composite lining of layers of copper being composed of an underlying steam permeable, thin porous layer of copper about 2 to about 5 microns thick having been initially deposited on the inside surface of the metal casing while said surface was substantially oxide free, and an overlying second layer about 5 to about 8 microns thick of subsequently deposited copper.

* * * * *